US008660874B2

(12) United States Patent
Allam et al.

(10) Patent No.: US 8,660,874 B2
(45) Date of Patent: Feb. 25, 2014

(54) INTEGRATED TECHNOLOGY (IT) ESTIMATION MODELING

(75) Inventors: Abdul Allam, Durham, NC (US); Kishore Channabasavaiah, Schaumburg, IL (US); Kerrie L. Holley, San Francisco, CA (US); Pawan Khera, Seattle, WA (US); Subhash K. Kothuru, West Bloomfield, MI (US); William D. James, Cambridge, MA (US); Sri Ramanathan, Tampa, FL (US); Siljan H. Simpson, Dallas, TX (US); Matthew B. Trevathan, Atlanta, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/608,406

(22) Filed: Oct. 29, 2009

(65) Prior Publication Data

US 2011/0106575 A1    May 5, 2011

(51) Int. Cl.
G06Q 10/00    (2012.01)
(52) U.S. Cl.
USPC .......................................... 705/7.12
(58) Field of Classification Search
USPC .......................................... 705/7.12
See application file for complete search history.

(56) References Cited

U.S. PATENT DOCUMENTS

| 7,092,968 | B1 * | 8/2006 | Ebel et al. .............................. | 1/1 |
|---|---|---|---|---|
| 7,225,141 | B2 | 5/2007 | Calderaro et al. | |
| 7,548,871 | B2 * | 6/2009 | Ricketts ........................ | 705/7.12 |
| 7,580,901 | B2 * | 8/2009 | Johnson et al. ................ | 705/400 |
| 7,957,994 | B2 * | 6/2011 | Brown et al. ................. | 705/7.11 |
| 8,032,404 | B2 * | 10/2011 | Lee et al. ...................... | 705/7.17 |
| 8,032,585 | B2 * | 10/2011 | Cherkasova et al. ........... | 709/203 |
| 2007/0179793 | A1 * | 8/2007 | Bagchi et al. ...................... | 705/1 |
| 2008/0052314 | A1 * | 2/2008 | Batabyal .................... | 707/104.1 |
| 2008/0127079 | A1 * | 5/2008 | Joss et al. ....................... | 717/120 |
| 2010/0088701 | A1 * | 4/2010 | Greiner et al. ................ | 718/100 |

OTHER PUBLICATIONS

Tansey, B.; Stroulia, E.; , "Valuating Software Service Development: Integrating COCOMO II and Real Options Theory," Economics of Software and Computation, 2007. ESC '07. First International Workshop on the , vol., no., pp. 8, May 20-26, 2007 doi: 10.1109/ESC.2007.11. URL: http://ieeexplore.ieee.org/stamp/stamp.jsp?tp=&arnumber=4273054&isnumber=4273.*

(Continued)

Primary Examiner — Peter Choi
Assistant Examiner — George H Walker
(74) Attorney, Agent, or Firm — Matthew Chung; Keohane & D'Alessandro, PLLC

(57) ABSTRACT

In general, the present invention provides a technique for IT estimation modeling of any organization. Although this estimation model is applied to SOA herein, it is not limited to solely estimating SOA activities; the maturity-based estimation modeling can be applied to other areas and disciplines, even beyond the IT industry. The maturity-based model of the present invention also offers executives and project managers a very effective estimating tool to analyze the impact of project variances. Resources do not need to be taken off projects and assigned to perform estimations, as this model acquires knowledge over time and delivers ever more precise estimates with each successive project. Executives and project managers may analyze the effects of additional staff, function changes, or other events to an overall project. Additionally, new projects may be estimated without utilizing current personnel with this adaptive learning model.

24 Claims, 6 Drawing Sheets

(56) References Cited

OTHER PUBLICATIONS

Papazoglou M, Traverso P, Dustdar S, Leymann F. "Service-Oriented Computing:: A Research Roadmap." International Journal of Cooperative Information Systems [serial online]. Jun. 2008;17(2):223-255. Available from: Business Source Complete, Ipswich, MA. Accessed Feb. 25, 2012.*
David Linthicum. "How Much Will Your SOA Cost?" Apr. 17, 2007, http://davidlinthicum.sys-con.com/node/318452.*
O'Brien, L.;, "A Framework for Scope, Cost and Effort Estimation for Service Oriented Architecture (SOA) Projects," Software Engineering Conference, 2009. ASWEC '09. Australian , vol., no., pp. 101-110, Apr. 14-17, 2009. doi: 10.1109/ASWEC.2009.35 URL: http://ieeexplore.ieee.org/stamp/stamp.jsp?tp=&arnumber=5076632&isnumber=5076603.*
L. Cherbakov, G. Galambos, R. Harishankar, S. Kalyana, and G. Rackham. "Impact of service orientation at the business level." IBM Systems Journal, vol. 44, No. 4, 2005.*
J. Strosnider, P. Nandi, S. Kumaran, S. Ghosh, and A. Arsanjani. Model-driven synthesis of SOA solutions. IBM Systems Journal, pp. 415-432, Jul. 2008. doi>10.1147/sj.473.0415.*
Liam O'Brien (A Framework for Scope, Cost and Effort Estimation for Service Oriented Architecture (SOA) Projects, 2009).*
Cherbakov et al. ("Impact of service orientation at the business level." IBM Systems Journal, vol. 44, No. 4, 2005).*
IBM Redbooks (Best Practices for Using WebSphere Business Modeler and Monitor, International Business Machines Corporation, 2006).*

* cited by examiner

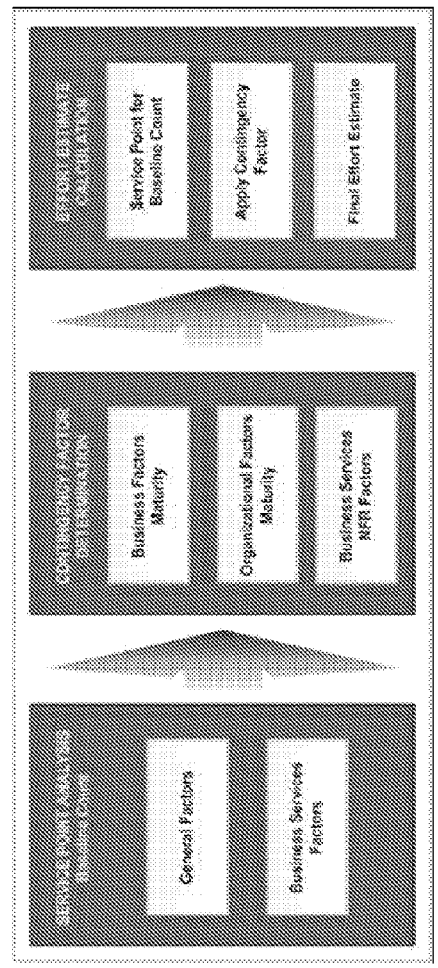
FIG. 2

| THIS SECTION PROVIDES THE DESCRIPTION OF THE FACTOR | | THIS IDENTIFIES THE MEASUREMENT THAT THIS FACTOR BELONGS TO | THIS IS THE MEASUREMENT FACTOR SHORT DESCRIPTION | THIS SECTION CAPTURES THE ASSESSMENT OF THE MATURITY OF THIS FACTOR W.R.T. TO THIS ORGANIZATION AND THE INITIATIVE IN CONTEXT | |
|---|---|---|---|---|---|
| CRITERIA: ORGANIZATIONAL MATURITY | | FACTOR: SOA SKILL MATURITY 34 | | ASSESSED MATURITY 36 | % SCORE IMPACT 38 −6% |
| FACTOR DESCRIPTION 32 | | DEGREE OF MATURITY (SCALED FROM HIGH TO LOW) | | | |
| THE MATURITY OF THE SOA SKILLS HAS A MAJOR INFLUENCE ON THE EFFORT ESTIMATE. THE SOA SKILLS CONSIST OF SERVICE DEVELOPMENT AND SERVICE DEPLOYMENT. THIS FACTOR ALSO ADDRESSES SKILLS RELATING TO ADHERENCE TO SOA GOVERNANCE POLICIES AND PROCEDURES. IS THIS FACTOR A SIGNIFICANT MEASUREMENT AND SHOULD BE MEASURED INDEPENDENTLY OF THE OVERALL CRITERIA? SIGNIFICANT ○ MARGINAL ○ SUBSET ○ | | 5. HIGHEST LEVEL OF SOA MATURITY | | | |
| | | 4. THE SOA SKILLS HAVE REACHED HIGH LEVEL OF MATURITY, WHERE THE TEAM OF SMEs PROVIDE GUIDANCE TO NEW PROJECTS AND HAVE WELL DOCUMENTED LIST OF BEST PRACTICES THAT THE TEAMS ARE ABLE TO USE ON NEW PROJECTS | | X | 2% |
| | | 3. THE ORGANIZATION HAS ADOPTED THE SOA STRATEGY ENTERPRISE WIDE AND HAD COMPLETED SEVERAL SUCCESSFUL PROJECTS. THE ORGANIZATION HAS DEVELOPED A STRONG SKILL BASE AND IS PROGRESSING TO THE NEXT LEVEL OF MATURITY | | | 0% |
| | | 2. SOA WORK IS LIMITED TO THE DEVELOPMENT OF DISCONNECTED SERVICES AND NOT MANAGED BY AN ENTERPRISE WIDE GOVERNANCE BODY | | | 4% |
| | | 1. NO PRIOR SOA RELATED WORK HAS BEEN DONE IN THE ORGANIZATION | | | 6% |

MEASUREMENT DATA POINTS AND ASSESSMENT GUIDELINES
- SOA SKILLS AS REFERRED TO IN THIS CRITERIA INCLUDE BOTH TECHNICAL SKILLS AND ORGANIZATIONAL SKILLS.
- THE TECHNICAL SKILLS CONSISTS OF THE DESIGN DEVELOPMENT, TESTING AND DEPLOYMENT SKILLS IN SOA CONCEPTS SUCH AS WEB SERVICE, WSDL, XSD, XSLT, SCA, BPEL, ESB DESIGN PATTERN, ETC. ADDITIONALLY, THE FAMILIARITY WITH THE SOFTWARE PRODUCTS AND TOOLSETS SELECTED BY THE ORGANIZATION FOR THE SOA INITIATIVE ARE ALSO INCLUDED WITHIN TECHNICAL SKILLS.
- ORGANIZATIONAL SKILLS REFER TO THE FAMILIARITY WITH GOVERNANCE PROCESS AND PROCEDURES IN COORDINATING THE DEVELOPMENT AND SOFTWARE DEPLOYMENT ACTIVATED WITH OTHER BUSINESS UNITS. THIS INCLUDES THE AWARENESS OF DECISION MAKING RIGHTS, ESCALATION PROCEDURES AND OTHER GOVERNANCE POLICIES.

THIS SECTION PROVIDES MATURITY MEASUREMENT GUIDELINES AND DATA POINTS ENABLING THE MATURITY ASSESSMENT PROCESS

THIS SECTION IDENTIFIES THE SIGNIFICANCE OF THIS FACTOR W.R.T. BEING MEASURED AS A PART OF THE DESIGNATED OR INDEPENDENTLY AT THE LEVEL OF THE CRITERIA

FIG. 3

INTEGRATED TECHNOLOGY (IT) ESTIMATION MODELING

FIELD OF THE INVENTION

In general, the present invention relates to estimation modeling. Specifically, the present invention relates to IT estimation modeling.

BACKGROUND OF THE INVENTION

Today's IT estimation techniques are simplistic in nature and are not well-suited for generating precise estimates for service-oriented projects. Service-oriented estimation requires the inclusion of additional factors in order to derive accurate project estimates. Specifically, the current estimation techniques and models do not take into account several variances (for example, culture, readiness, and organizational change, to name a few) which if not addressed have a significant impact on the reliability of the estimates. In fact, these variables in present estimation approaches must be discovered and accounted for in the form of new tasks without taking into account the impact to the estimation model if the task is not completed on time or satisfactorily. Such an approach often fails to account for the cultural adoption needed for the methods to be useable and, worse, the estimation model cannot account for the fact that the team has not adopted the methods which is an assumption in the estimation model.

Service-oriented architecture (SOA) requires a framework or estimation model which allows and recognizes both the specific tasks that must be completed as part of a project or program while taking into consideration both transformational goals often required as part of the project and maturity of the organization which will both implement and use the solution being estimated.

Drawbacks of known solutions include, among others, the following: primary focus on effort required for IT solution development/construction; focus only on development of IT components to fulfill the current set of requirements; a failure to take into account organizational maturity and skills maturity; factors that influence reduction in effort over time are not considered for estimation purposes; and the impact of re-factoring and reuse is not considered during estimation.

SUMMARY OF THE INVENTION

In general, the present invention provides a technique for IT estimation modeling of any organization. Although this estimation model is applied to SOA herein, it is not limited to solely estimating SOA activities, the maturity-based estimation modeling can be applied to other areas and disciplines, even beyond the IT industry. The maturity-based model of the present invention also offers executives and project managers a very effective estimating tool to analyze the impact of project variances. Resources do not need to be taken off projects and assigned to perform estimations, as this model acquires knowledge over time and delivers ever more precise estimates with each successive project. Executives and project managers may analyze the effects of additional staff, function changes, or other events to an overall project. Additionally, new projects may be estimated without utilizing current personnel with this adaptive learning model.

A first aspect of the present invention provides a method for modeling Integrated Technology (IT) modeling, comprising: estimating an effort required to realize each of a set of services within an IT infrastructure; identifying and applying a service complexity factor to each effort estimated; identifying and estimating a set of business service factors for each of the set of services; and estimating a baseline count for each of the set of services using the set of business service factors.

A second aspect of the present invention provides a system for modeling Integrated Technology (IT) modeling, comprising: a module for estimating an effort required to realize each of a set of services within an IT infrastructure, the IT infrastructure comprising a combination of computer hardware and computer software; a module for identifying and applying a service complexity factor to each effort estimated; a module for identifying and estimating a set of business service factors for each of the set of services; and a module for estimating a baseline count for each of the set of services using the set of business service factors.

A third aspect of the present invention provides a computer readable medium containing a program product for modeling Integrated Technology (IT) modeling, the computer readable medium comprising program code for causing a computer to: estimate an effort required to realize each of a set of services within an IT infrastructure; identify and apply a service complexity factor to each effort estimated; identify and estimate a set of business service factors for each of the set of services; and estimate a baseline count for each of the set of services using the set of business service factors.

A fourth aspect of the present invention provides a method for deploying an application for modeling Integrated Technology (IT) modeling, comprising: deploying a computer infrastructure being operable to: estimate an effort required to realize each of a set of services within an IT infrastructure; identify and apply a service complexity factor to each effort estimated; identify and estimate a set of business service factors for each of the set of services; and estimate a baseline count for each of the set of services using the set of business service factors.

A fifth aspect of the present invention provides a data processing system for modeling Integrated Technology (IT) modeling, comprising: a memory medium comprising instructions; a bus coupled to the memory medium; a processor coupled to the bus that when executing the instructions causes the data processing system to: estimate an effort required to realize each of a set of services within an IT infrastructure; identify and apply a service complexity factor to each effort estimated; identify and estimate a set of business service factors for each of the set of services; and estimate a baseline count for each of the set of services using the set of business service factors.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a block diagram 20 describing the calculation of net estimates according to the present invention.

FIG. 3 depicts a sample pre-filled measurement factor maturity assessment and scoring template according to the present invention.

Figure 1:
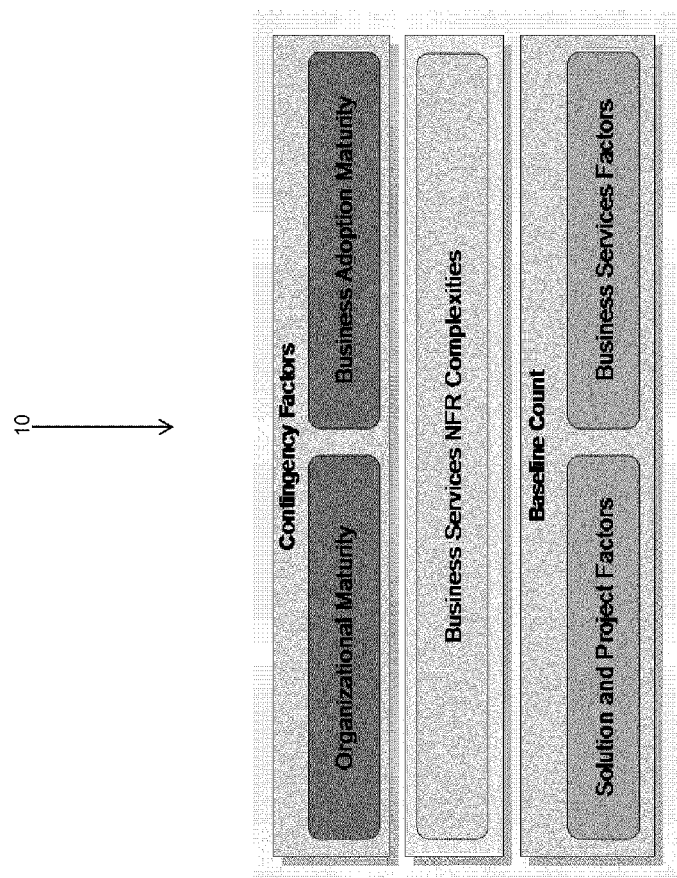
FIG. 1 depicts a block diagram 10 showing an approach for IT estimation according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Drawings has the following sections:
I. General Description
II. Computerized Implementation I. General Description In general, the present invention provides a technique for IT estimation modeling of any organization. Although this estimation model is applied to SOA herein, it is not limited to solely estimating SOA activities, the maturity-based estimation modeling can be applied to other areas and disciplines, even beyond the IT industry. The maturity-based model of the present invention also offers executives and project managers a very effective estimating tool to analyze the impact of project variances. Resources do not need to be taken off projects and assigned to perform estimations, as this model acquires knowledge over time and delivers ever more precise estimates with each successive project. Executives and project managers may analyze the effects of additional staff, function changes, or other events to an overall project. Additionally, new projects may be estimated without utilizing current personnel with this adaptive learning model.

Our innovation takes into consideration additional factors over and above today's estimation techniques. These additional factors include maturity aspects of several factors that influence solution development and deployment efforts. A maturity assessment is initially performed and maturity level scores are assigned. The maturity level scores will ensure that consistent and accurate estimates are generated and the impact of improving maturity levels can be determined via new estimations. The estimation model also takes into consideration business services, function, infrastructure, and maturity levels of: an organization's skill level, technical environment, and technical complexity. The maturity assessment assignment takes into consideration both the organizational maturity level and the maturity level of any third party firm that will participate in the project. The composite maturity rating will be used in the estimation modeling. In the event that there is not a third party firm, the organization's own maturity ratings will influence the estimations.

This model can be used to perform assessments of whether additional training or bringing in subject matter experts would have a significant impact on project durations, schedule recovery, or costs. Advantages of using our invention include, among others:

1. Minimizing the use of assumptions which have unintended consequences on the estimate. Often estimates are unrealistic or, worse, known to be false at the time of the estimate and are in place solely to provide a means of citing why the estimate is faulty when more information is known. In addition, teams often cannot reliably determine the assumptions that underlie their estimates since no objective framework exists for them to use. Our solution remedies this problem by providing a maturity-based effort contingency measurement moderation framework, which accounts for the variables which get translated to assumptions. In addition, our invention requires the performance of an assessment as part of the estimation process providing additional and necessary information to create a reliable estimate.

2. Projects leveraging or adopting SOA often are part of larger transformational initiatives or have business goals which are expected to be realized incrementally. Our invention accounts for both short and long-term desired benefits. As a result, the incremental costs associated with transformation can be identified and an informed choice made as to whether to include or omit specific goals from a project. This is in contrast to present approaches where the long-term goals are compromised on a project due to cost, but not determined until the project is largely completed.

3. Provides a customizable framework and measurement metrics to provide consistency and common understanding of required factors to be estimated for projects which are first of a kind, or projects which must be done due to market forces but carry a considerable risk.

Additional areas where this tool can be used are:
For project impact analysis as opposed to its original intended use for project estimation modeling.
Team leaders or executives can modify assumptions to determine impacts on tasks and activities.

Referring to FIG. 1, a block diagram 10 depicts the approach of the present invention. Specifically, the Maturity-based Estimation Model (MBEM) approach to estimation works on a multi-step process which allows for identifying the base estimates (baseline count). Then, we apply the calculated percentage impact based on the maturity of these organizational and business contingency criteria. The base estimates are a sum total of the service points calculated from the effort estimation of the solution and project factors and the business services factors.

Realization of a SOA is the realization of loosely coupled services which have externalized service descriptions. In addition, the implementation details of these services are completely hidden from the consumers of these services. The modeling of these services is achieved by rising the level of abstractions of the well-known modeling constructs like object-oriented analysis and component modeling. The focus of modeling, design, and implementation of services is based on identifying the functional and non-functional aspects of the services and the interface specifications required at the right level of abstraction.

The proposed estimation model defines an approach for estimating the effort required to realize services in a SOA. The proposed estimation model raises the level of abstraction for effort estimation with a focus on services. The effort required to define, design, and implement services is used as a foundation for this overall model. In addition the model also considers aspects of service maturity as a key contingency factor along with a number of others to define a much more comprehensive approach and technique for estimating the effort required to realize services and thereby a SOA.

Existing estimation techniques were focused on number of objects, components, and integration interfaces and the effort required for realizing each of these aspects of the overall solution. In addition these estimating techniques had no notion of solution maturity including organizational or resource maturity.

The proposed model leverages the techniques available in these existing techniques, but provides for a more comprehensive approach for effort estimation with a focus on a number of contingency factors including maturity. This model could be effectively adapted to estimate the effort required for solutions other than those based on Service-Oriented Architecture.

Calculating the Net Estimates

Referring to FIG. 2, a block diagram 20 describing the calculation of net estimates under the present invention is shown. Under the present invention, it is assumed that the solution and project factors measure the functional aspects of the solution in context, and the related information and integration issues involved. The business services factors address the measurement of various factors that address the business services deployment and management layer of the solution. The contingency criteria are measured based on the maturity of the various factors that have potential impact on the delivery and deployment of this shared services initiative from the view of business, organizational, and business services non-functional factors point-of-view.

Also under the present invention, the baseline count or the base estimates are constituted by a sum total of Service Points from the project and solution factors and the business services factors.

Baseline Count Calculation

The Baseline Count is the foundation for the overall effort estimation model. The Baseline Count includes two key aspects including the Business Services Factors and the Solution and Project Factors. The Business Services Factors, as the name implies includes a set of criteria that are business focused and influence the Solution and Project Factors. The Solution and Project Factors based on these Business Services Factors enable the determination of the overall Baseline Count and thereby the effort estimation of software projects in general and SOA projects in particular.

The Business Services Factors include (among others) the: number of Business Goals; number of Business Processes identified for business transformation; and number of Business Activities or Business Process Tasks associated with the business processes.

The Business Goals that influence the overall Baseline Count are those that directly impact the IT transformation or those that can be automated. Sales Targets, Marketing Targets and other similar ones which directly do not influence the transformation or automation are not included in the overall set considered for estimation. The KPI's and metrics associated with the Business Goals enabling IT transformation and automation also play a significant role in the overall estimation model. These KPI's influence the non-functional aspects of the solution and are leveraged for determining the contingency factors described later as part of the overall estimation model. Business Processes directly influence the overall Baseline Count required for effort estimation. The number of Business Processes and the Business Activities or the Business Process Tasks together enables the determination of the Project and Solution Factors. The business processes are a high level view of a business and the associated business activities provide a view of the different tasks required to complete a business process.

The Solution and Project Factors include (among others) the; number of probable and/or identified services; number of probable and/or identified service compositions; and number of Integration Points—Data, internal and external. The Number of Services is the actual number of services required for realization of the overall SOA solution. These are determined based on the actual number of business goals, the business processes, and the associated business activities. The overall Baseline Count, which is the foundation for the overall estimation model is equal to the total effort required to realize all the services required in the overall solution. The total effort required for the realization of all the services can be determined by individually estimating the effort required to implement each of the services. The total effort (in hours) required to realize each service is dependent on a number of factors including the: number of resources required for implementing a given service; number of hours for each resource over the entire solution delivery lifecycle for a given service; and total number of hours required by all the resources for a given service. Each resource may require a different number of hours to complete the tasks to realize a given service. The total effort required to realize each service is the sum of the hours of effort required by all the resources identified for a given service.

In addition, the services can be categorized, for example, as low, medium and high, based on the complexity of the services. The total estimated effort for realization of a single service can be associated with a category like "low complexity" and the effort for the other categories can be related to the base category as a multiple of the factor of complexity. This is depicted as follows:

Total Effort Required for each Service Implementation=(Complexity Factor×Estimated Effort from Above)

As such, for:

Low Complexity Services, Complexity Factor=1

Medium Complexity Services, Complexity Factor=1.4

High Complexity Services, Complexity Factor=1.8

For a solution with less complexity, a categorization of services may not be essential. Also extremely complex solutions may warrant more categories. In addition these categories can be associated with a suitable complexity factor which can be calibrated.

In addition, the resources required may include a number of resource types which include Service Designers, Service Developers, Testers and Project Managers, and they participate in the overall solution delivery lifecycle during different phases including solution definition, design, implementation, testing, and deployment. These resource types would have no impact on the overall estimates.

Total Effort for Realization of all Services=Effort for Service 1,+Effort for Service 2+Effort for Services N . . . .

Baseline Count=Total Effort Realization of all Services. Once the Baseline Count is calculated, then the contingency factors or contingency scores are determined and applied to the Baseline Count to calculate the final estimate for the overall solution. This is described in the remaining sections.

As the first step of calculating the contingency scores, the maturity scores (% impact) of each of the factors from the contingency criteria are aggregated at the individual criteria. Then, we apply the weighted factor to each of the contingency gross scores to arrive at a contingency allocation score.

The default estimation model contingency factor allocation score is as follows:

| Contingency score allocation table | |
|---|---|
| Contingency criteria | Moderation Allocation |
| Shared Services non-functional Complexities | 33.33% |
| Organizational Contingencies | 33.33% |
| Business Adoption Contingencies | 33.34% |

The user (organization) applying this estimation model can modify this allocation table depending on their organizational environment factors including organizational maturity that impact such initiatives in consideration. This helps fine-tune this estimation model depending on the degree of relevance of each of these criteria within the organization for such initiatives.

Next, each of the criteria measurement is taken and the maturity of the various factors within each of the factors is assessed and the respective factors are rated. FIG. 3 shows a sample pre-filled measurement factor maturity assessment and scoring template 30. Template 30 includes factor descriptions 32, degrees of maturity 34, assessed maturity 36, and score impact 38.

As the very next step, we take the % Score Impact from each of the assessed factor, and aggregate them within its respective criteria. Then, we take the gross contingency score and apply the moderation allocation percentages to ensure the skew of the respective criteria based on the customized organizational environment.

> Business Services non-functional Complexities Score=Sum total of "% Score Impact" column from Factors that belong to this criteria.
>
> Organizational Contingencies Score=Sum total of "% Score Impact" column from Factors that belong to this criteria.
>
> Business Adoption Contingencies Score=Sum total of "% Score Impact" column from Factors that belong to this criteria.

Some representative factors for these contingency criteria are identified below:

a. Business Services non-functional Complexities
   Number of provider applications (service implementations)
   Number of design time service composites
   Provider Application(s) complexity
   Number of inputs or service end-points (testing only)
   Compliance with Service Level Agreement including service availability, reliability, and performance
   Cross application security requirements such as encryption, authentication, and authorization
b. Organizational Maturity Contingencies
   Organizational skill level in deploying and managing SOA approach and implementations
   Business ownership of IT initiatives
   IT strategy alignment with business goals
   Organizational structure
   SOA Skills and resource availability
c. Business Adoption Maturity Contingencies
   Compliance with regulatory requirements
   Compliance with industry and technical standards The next set of steps are focused on using the base estimates, applying the moderation scores on the contingency and complexity criteria scores, and arriving at the net estimates for the overall initiative.

> Gross Contingency Score=Shared Services non-functional Complexities Score+Organization Contingencies Score+Business Adoption Contingencies Score
>
> Shared Services non-functional Complexities Moderated Score=(Shared Services non-functional Complexities Score/Gross Contingency Score) *Moderation Allocation % for this criteria
>
> Organizational Contingencies Moderated Score=(Organizational Contingencies Score/Gross Contingency Score)*Moderation Allocation % for this criteria
>
> Business Adoption Contingencies Moderated Score= (Business Adoption Contingencies Score/Gross Contingency Score)*Moderation Allocation % for this criteria
>
> Contingency Gross Score=Shared Services non-functional Complexities Moderated Score+Organization Contingencies Moderated Score+Business Adoption Contingencies Moderated Score The base estimates (Service Points) are now multiplied with the sum total of % impact scores (Contingency Gross Score) accumulated from the moderation calculations.

> Total Effort Estimates=Base Estimates+(Contingency Gross Score*Base Estimates)

Allocation Net Estimates
Allocating Engagement Phases

Once we arrive at the Net Estimates we can now apply and allocate these estimates to the various engagement phases that apply here. Here again this estimation model offers a baseline engagement phase structure and can be customized to suit the user organization's methodology. In addition, the percentages allocated to the different phases can be customized based on the organizational maturity. For example, in the case of a more mature organization, Build may require 20% of the effort versus Requirements and Design requiring more emphasis.

Figure 4:
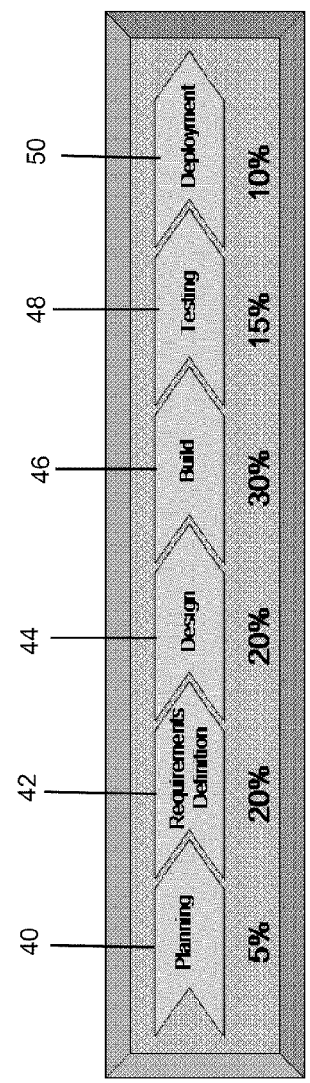
FIG. 4 outlines the phases of a typical engagement according to the present invention.

FIG. 4 outlines the phases of a typical engagement. As can be seen, the phases include planning 40, requirements definition 42, design 44, build 46, testing 48, and deployment 50. Next, we take the allocation percentages and allocate Total Effort Estimates among the various phases as per the following:

> Planning Estimates=Net Effort Estimates*Planning Allocation %
>
> Requirement Estimates=Net Effort Estimates*Requirements Allocation %
>
> Design Estimates=Net Effort Estimates*Design Allocation %
>
> Build Estimates=Net Effort Estimates*Build Allocation %
>
> Testing and Deployment Estimates=Net Effort Estimates*Testing and Deployment Allocation %

Allocating Net Estimates to Resources and arriving at FTE estimates

Once the allocation to the respective Engagement Phases is done, we now use the Estimation Model Resource Allocation ratios, and allocate the effort estimates to the respective resources by phases. The suggested allocation is once again the standard % allocation, and is modifiable based on an organization's environment maturity and related factors.

Figure 5:
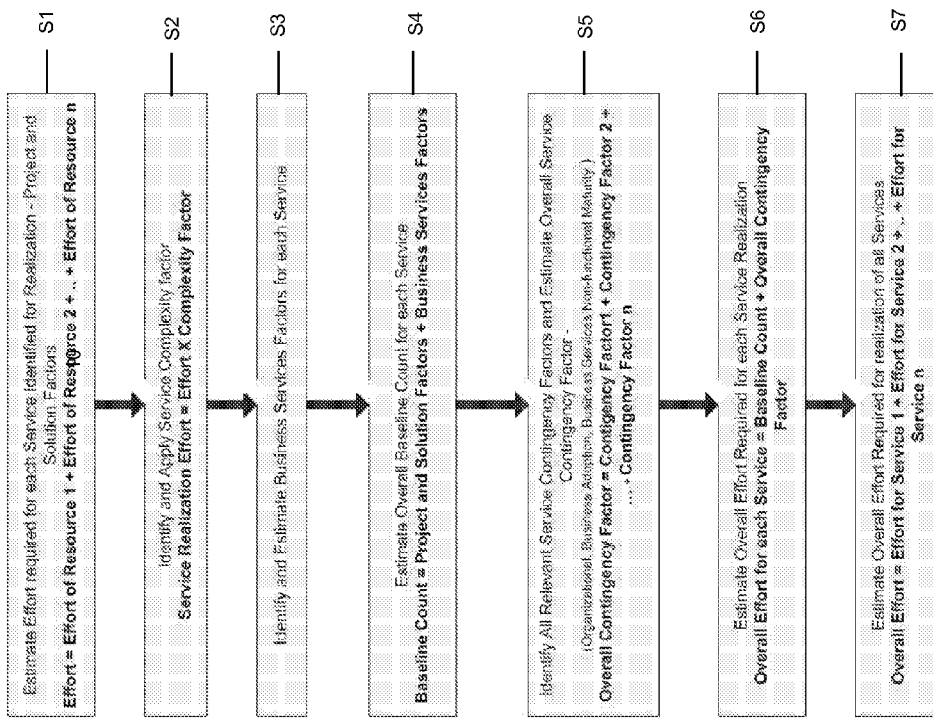
FIG. 5 depicts a method flow diagram 60 according to the present invention.

Referring to FIG. 5, a method flow diagram 60 is shown. As depicted step S1 is to estimate the effort required to realize each of a set of services within an IT infrastructure. Step S2 is to identify and apply a service complexity factor to each effort estimated. Step S3 is to identify and estimate a set of business service factors for each of the set of services. Step S4 is to estimate a baseline count for each of the set of services using the set of business service factors. Step S5 is to identify a set of service contingency factors for the set of services, and estimate an overall service contingency factor base on the set of service contingency factors. Step S6 is to estimate an effort for each service realization based on the overall baseline count and the set of service contingency factors. Step S7, is to estimate an overall effort to realize all of the set of services collectively.

II. Computerized Implementation

Figure 6:
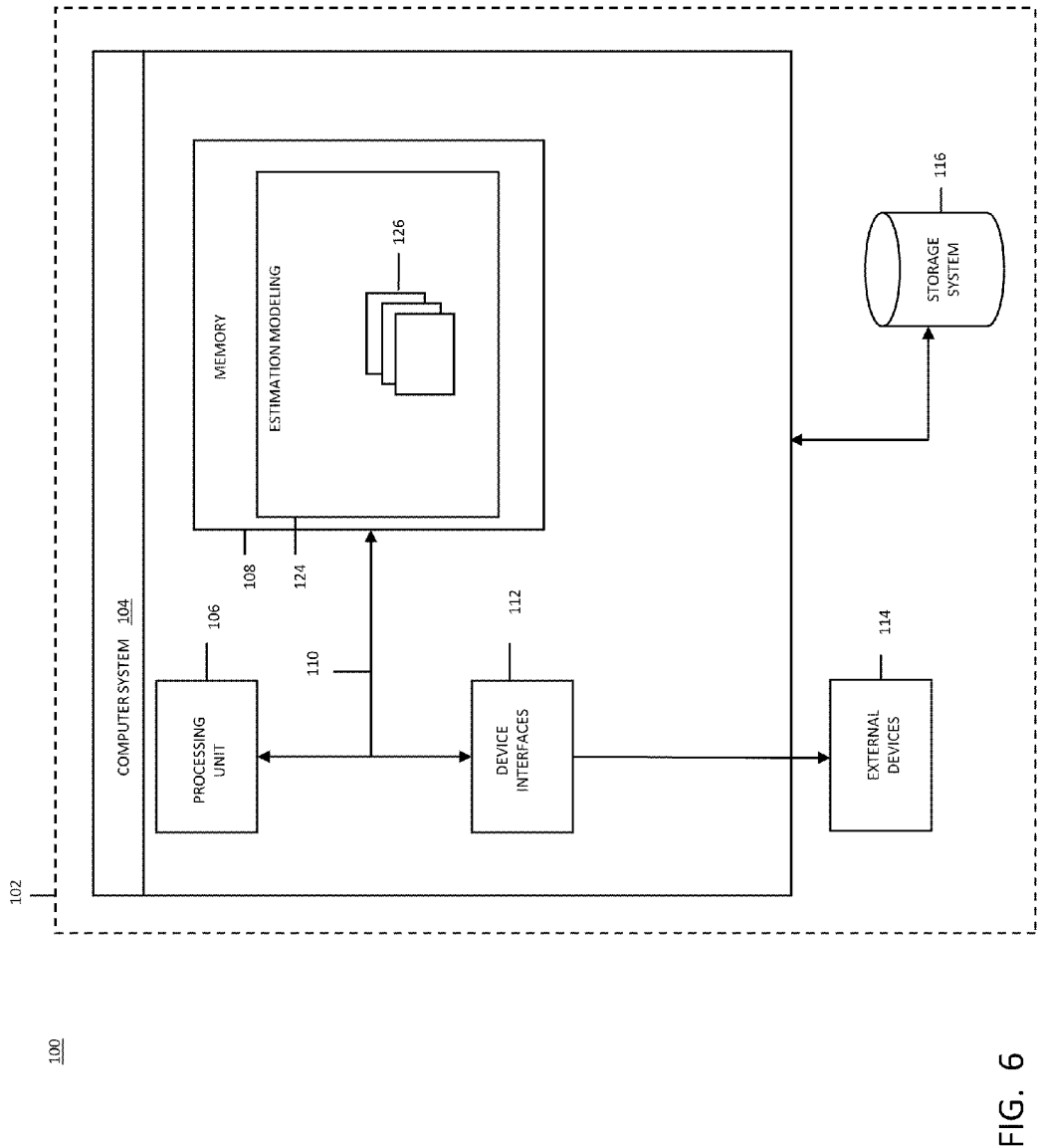
FIG. 6 depicts a computerized implementation according to the present invention.

Referring now to FIG. 6, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. It should be understood that any other computers implemented under the present invention will have similar components, but may perform different functions/have different software. As shown, computer system 104 includes a processing unit 106, a memory 108, a bus 110, and device interfaces 112. Further, computer system 104 is shown communicating with one or more external devices 114 that communicate with bus via device interfaces. In general, processing unit 106 executes computer program code, such estimation modeling system/program 124 (block 18 in FIG. 1), which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 6 can be included in computer system 104.

Storage system 116 can be any type of system capable of providing storage for information under the present invention. To this extent, storage system 116 could include one or more storage devices such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104. Shown in memory 108 of computer system 104 is estimation modeling system/program 124, which has a set of modules 126. Set of modules 126 generally provide the functions of the present invention as described herein.

While shown and described herein as an approach for estimation modeling, it is understood that the invention further provides various alternative embodiments. For example, in one embodiment, the invention provides a computer-readable/useable medium that includes computer program code to enable a computer infrastructure to provide estimation modeling. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide estimation modeling. In this case, the service provider can create, maintain, support, etc., a computer infrastructure, such as computer infrastructure 102 (FIG. 6) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for virtual medical diagnosis and emulation. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers. It is inherent herein that the present invention is tied to at least one machine (e.g., computer system 102), and/or transforms at least one article (e.g., patient data, avatars, etc.) and/or data representative of one article (e.g. imaging data).

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

We claim:

1. A method for modeling Integrated Technology (IT) modeling for an engagement, comprising:
    identifying, by at least one computing device, a set of services that are required to realize an overall solution;
    categorizing, by the at least one computing device, each service of the set of services based on a complexity of said each service by estimating, by the at least one computing device, an estimated effort required to realize each said service within an IT infrastructure;
    computing, by the at least one computing device, a total effort required to realize said each service by multiplying a service complexity factor by said each effort estimated, wherein the service complexity factor represents a multiple of the complexity of a predetermined base category;
    identifying and estimating, by the at least one computing device, a set of business service factors for the each service;
    estimating, by the at least one computing device, a baseline count by summing the total effort required for the services;
    identifying, by the at least one computing device, a set of service contingency factors for each of the set of business service factors that applies to each of the set of services;
    assigning, by the at least one computing device, a moderation allocation for each of the set of business service factors, the moderation allocation including a weight that indicates a degree of relevance of each of the business service factors;
    evaluating, by the at least one computing device, a maturity of each of the set of service contingency factors;
    outputting, by the at least one computing device, a set of impact scores based on the evaluating, the set of impact scores including a percentage score indicating the impact of maturity on each of the set of service contingency factors;
    computing, by the at least one computing device, a set of contingency scores by multiplying each of the set of impact scores with the assigned moderation allocation;
    aggregating, by the at least one computing device, the set of contingency scores of each of the set of business service factors within each of the set of services;
    outputting, by the at least one computing device, a set of gross contingency scores based on the aggregation, each of the set of gross contingency scores corresponding to one service of the set of services;
    calculating, by the at least one computing device, a total effort estimate by summing the baseline count with a product of the baseline count and a gross contingency score, from the set of gross contingency scores, associated with the set of services; and
    allocating, by the at least one computing device, resources for phases of the engagement based on the total effort estimates and resource allocation estimates for each of the phases in accordance with predetermined percentages for each of the phases, wherein the phases comprise at least one of planning, requirements definition, design, build, testing, and deployment;
    wherein the set of business service factors comprise at least a number of business goals, a number of business processes identified for business transformation, and a number of business activities associated with the business processes.

2. The method of claim 1, further comprising estimating, by the at least one computing device, an effort for each service realization based on the overall baseline count and the set of service contingency factors.

3. The method of claim 2, further comprising estimating, by the at least one computing device, an overall effort to realize all of the set of services collectively.

4. The method of claim 1, the effort being estimated by summing, by the at least one computing device, an individual effort for each of a set of resources.

5. The method of claim 1, the baseline count being further based on a set of project and solution service factors.

6. The method of claim 1, further comprising outputting, by the at least one computing device, a report based on the estimation of the overall effort and the IT infrastructure.

7. A system for modeling Integrated Technology (IT) modeling for an engagement, comprising:
   at least one processing unit;
   memory operably associated with the at least one processing unit; and
   a utility stored in the memory and executable by the at least one processing unit, the utility performing a method comprising:
      identifying a set of services that are required to realize an overall solution;
      categorizing each service of the set of services based on a complexity of said each service by estimating an estimated effort required to realize said each service within an IT infrastructure, the IT infrastructure comprising a combination of computer hardware and computer software;
      computing a total effort required to realize said each service by multiplying a service complexity factor by said each effort estimated, wherein, the service complexity factor represents a multiple of the complexity of a predetermined base category;
      identifying and estimating a set of business service factors for the each service;
      estimating a baseline count by summing the total effort required for the services;
      identifying a set of service contingency factors for each of the set of business service factors that applies to each of the set of services;
      assigning a moderation allocation for each of the set of business service factors, the moderation allocation including a weight that indicates a degree of relevance of each of the business service factors;
      evaluating a maturity of each of the set of service contingency factors;
      outputting a set of impact scores, the set of impact scores based on the evaluating, the set of impact scores including a percentage score indicating an impact of maturity on each of the set of service contingency factors;
      computing a set of contingency scores by multiplying each of the set of impact scores with the assigned moderation allocation;
      aggregating the set of contingency scores of each of the set of business service factors within each of the set of services;
      outputting a set of gross contingency scores based on the aggregating, each of the set of gross contingency scores corresponding to one service of the set of services;
      calculating a total effort estimate by summing the baseline count with a product of the baseline count and a gross contingency score, from the set of gross contingency scores, associated with the set of services; and
      allocating resources for phases of the engagement based on the total effort estimates and resource allocation estimates for each of the phases in accordance with predetermined percentages for each of the phases, wherein the phases comprise at least one of planning, requirements definition, design, build, testing, and deployment;
   wherein the set of business service factors comprise at least a number of business goals, a number of business processes identified for business transformation, and a number of business activities associated with the business processes.

8. The system of claim 7, further comprising a module for estimating an overall service contingency factor based on the set of service contingency factors.

9. The system of claim 8, further comprising a module for estimating an effort for each service realization based on the overall baseline count and the set of service contingency factors.

10. The system of claim 9, further comprising a module for estimating an overall effort to realize all of the set of services collectively.

11. The system of claim 7, the effort being estimated by summing an individual effort for each of a set of resources.

12. The system of claim 7, the baseline count being further based on a set of project and solution service factors.

13. The system of claim 7, further comprising a module outputting a report based on the estimation of the overall effort and the IT infrastructure.

14. A non-transitory computer readable storage medium containing a program product for modeling Integrated Technology (IT) modeling for an engagement, the non-transitory computer readable storage medium comprising program code for causing a computer to:
   identify a set of services that are required to realize an overall solution;
   categorize each service of the set of services based on a complexity of said each service by estimating an estimated effort required to realize said each service within an IT infrastructure;
   compute a total effort required to realize said each service by multiplying a service complexity factor to by said each effort estimated, wherein, the service complexity factor represents a multiple of the complexity of a predetermined base category;
   identify and estimate a set of business service factors for the each service;
   estimate a baseline count by summing the total effort required for the services;
   identifying a set of service contingency factors for each of the set of business service factors that applies to each of the set of services;
   assign a moderation allocation for each of the set of business service factors, the moderation allocation including a weight that indicates a degree of relevance of each of the business service factors;
   evaluate a maturity of each of the set of service contingency factors;
   output a set of impact scores based on the evaluating, the set of impact scores including a percentage score indicating an impact of maturity on each of the set of service contingency factors;
   computing a set of contingency scores by multiplying each of the set of impact scores with the assigned moderation allocation;
   aggregate the set of contingency scores of each of the set of business service factors within each of the set of services;
   output a set of gross contingency scores based on the aggregating, each of the set of gross contingency scores corresponding to one service of the set of services;
   calculate a total effort estimate by summing the baseline count with a product of the baseline count and a gross contingency score, from the set of gross contingency scores, associated with the set of services; and allocate resources for phases of the engagement based on the total effort estimates and resource allocation estimates for each of the phases in accordance with predetermined percentages for each of the phases, wherein the phases comprise at least one of planning, requirements definition, design, build, testing, and deployment;

wherein the set of business service factors comprise at least a number of business goals, a number of business processes identified for business transformation, and a number of business activities associated with the business processes.

15. A non-transitory computer readable storage medium containing a program product of claim 14, the computer readable storage medium further comprising program code for causing the computer to estimate an overall service contingency factor base on the set of service contingency factors.

16. A non-transitory computer readable storage medium containing a program product of claim 15, the non-transitory computer readable storage medium further comprising program code for causing the computer to estimate an effort for each service realization based on the overall baseline count and the set of service contingency factors.

17. A non-transitory computer readable storage medium containing a program product of claim 16, the non-transitory computer readable storage medium further comprising program code for causing the computer to estimate an overall effort to realize all of the set of services collectively.

18. A non-transitory computer readable storage medium containing a program product of claim 14, the effort being estimated by summing an individual effort for each of a set of resources.

19. A non-transitory computer readable storage medium containing a program product of claim 14, the baseline count being further based on a set of project and solution service factors.

20. A non-transitory computer readable storage medium containing a program product of claim 14, the non-transitory computer readable storage medium further comprising program code for causing the computer to output a report based on the estimation of the overall effort and the IT infrastructure.

21. A method for deploying an application for modeling Integrated Technology (IT) modeling, comprising:
deploying a computer infrastructure being operable to:
identify a set of services that are required to realize an overall solution;
categorize each service of the set of services based on a complexity of said each service by estimating an estimated effort required to realize said each service within an IT infrastructure;
compute a total effort required to realize said each service by multiplying a service complexity factor by said each effort estimated, wherein the service complexity factor represents a multiple of the complexity of a predetermined base category;
identify and estimate a set of business service factors for the each service;
estimate a baseline count by summing the total effort required for the services;
identify a set of service contingency factors for each of the set of business service factors that applies to each of the set of services;
assign a moderation allocation for each of the set of business service factors, the moderation allocation including a weight that indicates a degree of relevance of each of the business service factors;

evaluate a maturity of each of the set of service contingency factors;
output a set of impact scores based on the evaluation, the set of impact scores including a percentage score indicating the impact of maturity on each of the set of service contingency factors;
computing a set of contingency scores by multiplying each of the set of impact scores with the assigned moderation allocation;
aggregate the set of contingency scores of each of the set of business service factors within each of the set of services;
output a set of gross contingency scores based on the aggregation, each of the set of gross contingency scores corresponding to one service of the set of services;
calculate a total effort estimate by summing the baseline count with a product of the baseline count and a gross contingency score, from the set of gross contingency scores, associated with the set of services; and
allocate resources for phases of the engagement based on the total effort estimates and resource allocation estimates for each of the phases in accordance with predetermined percentages for each of the phases, wherein the phases comprise at least one of planning, requirements definition, design, build, testing, and deployment;
wherein the set of business service factors comprise at least a number of business goals, a number of business processes identified for business transformation, and a number of business activities associated with the business processes.

22. The method of claim 21, the computer infrastructure being further operable to:
estimate an effort for each service realization based on the overall baseline count and the set of service contingency factors; and
estimate an overall effort to realize all of the set of services collectively.

23. A data processing system for modeling Integrated Technology (IT) modeling, comprising:
a memory medium comprising instructions;
a bus coupled to the memory medium;
a processor coupled to the bus that when executing the instructions causes the data processing system to:
identify a set of services that are required to realize an overall solution;
categorize each service of the set of services based on a complexity of said each service by estimating an estimated effort required to realize each said service within an IT infrastructure;
compute a total effort required to realize said each service by multiplying a service complexity factor by said each effort estimated, wherein the service complexity factor represents a multiple of the complexity of a predetermined base category;
identify and estimate a set of business service factors for the each service;
estimate a baseline count by summing the total effort required for the service;
identify a set of service contingency factors for each of the set of business service factors that applies to each of the set of services;
assign a moderation allocation for each of the set of business service factors, the moderation allocation including a weight that indicates a degree of relevance of each of the business service factors;

evaluate a maturity of each of the set of service contingency factors;

output a set of impact scores based on the evaluation, the set of impact scores including a percentage score indicating the impact of maturity on each of the set of service contingency factors;

computing a set of contingency scores by multiplying each of the set of impact scores with the assigned moderation allocation;

aggregate the set of contingency scores of each of the set of business service factors within each of the set of services;

output a set of gross contingency scores based on the aggregation, each of the set of gross contingency scores corresponding to one service of the set of services;

calculate a total effort estimate by summing the baseline count with a product of the baseline count and a gross contingency score, from the set of gross contingency scores, associated with the set of services; and allocate resources for phases of the engagement based on the total effort estimates and resource allocation estimates for each of the phases in accordance with predetermined percentages for each of the phases wherein the phases comprise at least one of planning, requirements definition, design, build, testing, and deployment;

wherein the set of business service factors comprise at least a number of business goals, a number of business processes identified for business transformation, and a number of business activities associated with the business processes.

24. The data processing system of claim 23, the data processing system being further caused to:

estimate an overall service contingency factor base on the set of service contingency factors;

estimate an effort for each service realization based on the overall baseline count and the set of service contingency factors; and estimate an overall effort to realize all of the set of services collectively.

* * * * *